United States Patent
Ishizaka

(10) Patent No.: US 10,764,080 B2
(45) Date of Patent: Sep. 1, 2020

(54) CONTROL SYSTEM AND MANAGEMENT APPARATUS

(71) Applicant: Mitsubishi Electric Corporation, Tokyo (JP)

(72) Inventor: Taichi Ishizaka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 176 days.

(21) Appl. No.: 15/741,062

(22) PCT Filed: Sep. 8, 2015

(86) PCT No.: PCT/JP2015/075447
§ 371 (c)(1),
(2) Date: Dec. 29, 2017

(87) PCT Pub. No.: WO2017/042879
PCT Pub. Date: Mar. 16, 2017

(65) Prior Publication Data
US 2018/0198639 A1 Jul. 12, 2018

(51) Int. Cl.
*H04L 12/28* (2006.01)
*H04Q 9/00* (2006.01)
(Continued)

(52) U.S. Cl.
CPC ...... *H04L 12/2825* (2013.01); *H04L 12/2836* (2013.01); *H04L 67/125* (2013.01);
(Continued)

(58) Field of Classification Search
CPC ..... H04L 12/2825; H04L 69/18; H04L 69/08; H04L 67/125; H04L 12/2836; H04M 3/00;
(Continued)

(56) References Cited

U.S. PATENT DOCUMENTS

2005/0246408 A1 11/2005 Chung
2006/0031457 A1 2/2006 Motoyama
(Continued)

FOREIGN PATENT DOCUMENTS

JP 2005-017815 A 1/2005
JP 4337891 B2 9/2009
(Continued)

OTHER PUBLICATIONS

International Search Report of the International Searching Authority dated Nov. 24, 2015 for the corresponding international application No. PCT/JP2015/075447 (and English translation).
(Continued)

*Primary Examiner* — Austin J Moreau
(74) *Attorney, Agent, or Firm* — Posz Law Group, PLC

(57) ABSTRACT

A control system transmits, to a remote monitoring server, report data generated based on operation data. The control system includes a facility-device management apparatus that generates report data based on the operation data, and a relay device that communicates with the remote monitoring server via an intra-facility LAN and communicates with the facility-device management apparatus via a connection line. The facility-device management apparatus includes setting means for setting whether or not the report data is to be transmitted to the remote monitoring server, first transmission means for transmitting the report data to the remote monitoring server, and second transmission means for transmitting the report data to the relay device. The relay device includes forwarding means for transmitting, to the intra-facility LAN, the report data received from the facility-device management apparatus.

13 Claims, 9 Drawing Sheets

(51) Int. Cl.
 *H04M 3/00* (2006.01)
 *H04M 11/00* (2006.01)
 *H04L 29/06* (2006.01)
 *H04L 29/08* (2006.01)
 *H04W 4/33* (2018.01)

(52) U.S. Cl.
 CPC .............. *H04L 69/08* (2013.01); *H04L 69/18* (2013.01); *H04M 3/00* (2013.01); *H04M 11/00* (2013.01); *H04M 11/007* (2013.01); *H04Q 9/00* (2013.01); *H04W 4/33* (2018.02)

(58) Field of Classification Search
 CPC ...... H04M 11/00; H04M 11/007; H04Q 9/00; H04W 4/33
 See application file for complete search history.

(56) References Cited

U.S. PATENT DOCUMENTS

2007/0143456 A1 6/2007 Mashinsky

| | | | |
|---|---|---|---|
| 2015/0172424 A1* | 6/2015 | Sone | H04W 4/70 370/401 |
| 2016/0028821 A1* | 1/2016 | Petisce | A61B 5/0022 709/219 |
| 2016/0080219 A1 | 3/2016 | Ishizaka | |

FOREIGN PATENT DOCUMENTS

| | | |
|---|---|---|
| WO | 2005/060611 A2 | 7/2005 |
| WO | 2014188530 A1 | 11/2014 |

OTHER PUBLICATIONS

Extended European Search Report dated Aug. 13, 2018 issued in corresponding EP patent application No. 15903545.0.
Office Action dated Mar. 11, 2020 issued in corresponding CN patent application No. 201580082819.X (and English translation).
Office Action dated Jun. 22, 2020 issued in corresponding CN patent application No. 201580082819.X (and English translation).

* cited by examiner

CONTROL SYSTEM AND MANAGEMENT APPARATUS

CROSS REFERENCE TO RELATED APPLICATION

This application is a U.S. national stage application of International Patent Application No. PCT/JP2015/075447 filed on Sep. 8, 2015, the disclosure of which is incorporated herein by reference.

TECHNICAL FIELD

The present disclosure relates to a control system and a facility-device management apparatus.

BACKGROUND ART

Technology for managing, via a network, facility devices such as air conditioners and lighting is becoming more widespread. In particular, in some buildings with numerous facility devices, the facility devices installed are monitored by a terminal connected, via a network, to the facility devices.

CITATION LIST

For example, in Patent Literature, 1 discloses a configuration of facility management apparatus for collecting data of air-conditioning equipment and periodically transmitting the data, via a network, to a server computer in a remote location.

Patent Literature

Patent Literature 1: Unexamined Japanese Patent Application Kokai Publication 2005-17815

SUMMARY OF INVENTION

Technical Problem

However, conventional technology poses a problem in that, work performed to establish a configuration for communicating data over a network while ensuring security, is costly.

Network-connected devices present an ever-increasing security risk as information technology continues to advance. Therefore, an administrator often imposes security restrictions on a system and network as he/she sees fit in order to protect devices and information from the threat of external unauthorized access.

In the case of a network managed with a high-security standard, when a facility device is newly installed, the device must be configured so that the settings are in compliance with the security standard. This requires a worker having sufficient knowledge of security to spend time and effort configuring facility devices to be security-standard compliant, consequently increasing work-related costs.

In order to solve the aforementioned problem, an objective of the present disclosure is to provide an easily implementable configuration that enables monitoring of facility devices via a network while ensuring security.

Solution to Problem

In order to achieve the aforementioned objective, a control system of the present disclosure is a system for transmitting to a remote monitoring server, first-protocol transmission data generated based on operation data acquired from a facility device. The control system includes a facility-device management apparatus configured to generate the first-protocol transmission data based on the operation data; and a relay device configured to communicate with the remote monitoring server via a network configured based on a first protocol, the relay device further configured to communicate with the facility-device management apparatus via a connection configured based on a second protocol. The facility-device management apparatus includes setting means for setting whether or not to transmit the first-protocol transmission data to the remote monitoring server; first transmission means for transmitting, when the first-protocol transmission data is set to be transmitted to the remote monitoring server, the first-protocol transmission data to the remote monitoring server; and second transmission means for, when the first-protocol transmission data is set not to be transmitted to the remote monitoring server, converting the first-protocol transmission data into second-protocol transmission data, and transmitting the second-protocol transmission data to the relay device. The relay device includes forwarding means for receiving the second-protocol transmission data from the facility-device management apparatus, converting the second-protocol transmission data into the first-protocol transmission data, and transmitting the first-protocol transmission data to the network.

Advantageous Effects of Invention

The present disclosure provides an easily implementable configuration that enables monitoring of facility devices via a network while ensuring security.

DESCRIPTION OF EMBODIMENTS

The embodiments of the present disclosure are described in detail below with reference to the drawings. However the same reference signs are used for the same parts throughout the drawings. The terms "up", "down", "left", and "right" are used in the below description with respect to the drawings. These terms are used merely to facilitate understanding and in no way limit the scope of the present disclosure.

Embodiment 1

Figure 1:
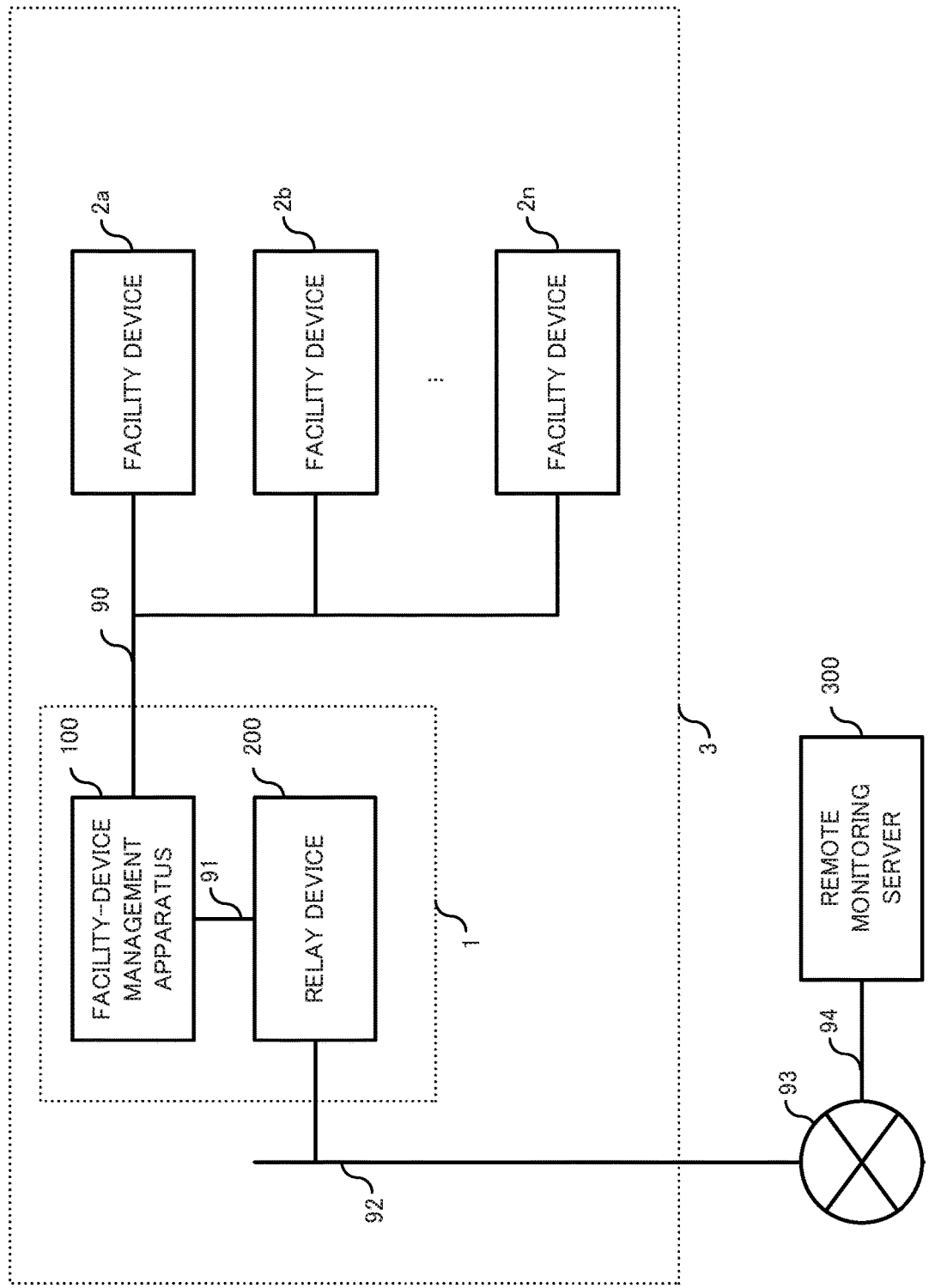
FIG. 1 is a schematic diagram illustrating a control system according to Embodiment 1.

A control system 1 of the present embodiment, as illustrated in FIG. 1, includes a facility-device management apparatus 100 for managing facility devices (facility devices 2a and 2b to 2n) and a relay device 200 that is connected to the facility-device management apparatus 100. The facility-device management apparatus 100 acquires, from each of the facility devices (facility devices 2a and 2b to 2n) targeted for monitoring, operation data indicating an operation state pertaining to the facility device, and stores the acquired operation data. Also, the facility-device management apparatus 100 periodically reports the stored operation data to a remote monitoring server 300. The relay 200 receives the operation data from the facility-device management apparatus 100 and then transmits the received operation data to the remote monitoring server 300 to which the operation data is to be reported.

The facility-device management apparatus 100 is connected, via a facility device network 90, with each of the facility devices (facility devices 2a and 2b to 2n) installed in a facility 3, and transmits and receives data to and from each of the facility devices via the facility device network 90. More particularly, the facility-device management apparatus 100 acquires, from each of the facility devices, data indicating the running state of the corresponding facility device, and then stores the data as the operation data. The operation data contains, for example, information regarding power consumption, running environment (set temperature and airflow strength) and error events that occurred, in the targeted facility device. The facility device network 90 may be configured in accordance with any standard, for example by a general-purpose wired network such as a wired local area network (LAN) and/or by a dedicated line.

The facility device (facility devices 2a and 2b to 2n) connected to the facility-device management apparatus 100 is installed in a room or a facility and is used as needed. Examples of facility devices include air conditioners, lighting, and room-entry management devices. However, the facility device is not restricted to these examples. The present embodiment is applicable to any kind of facility device. The example in FIG. 1 explicitly indicates that three facility devices 2a, 2b and 2n are connected to the facility-device management apparatus 100. However, there is no limit to the number of the facility devices that may be connected to facility-device management apparatus 100. That is, any number of the facility devices may be connected to the facility-device management apparatus 100.

The facility-device management apparatus 100 is connected to the relay device 200 by a connection line 91. The connection line 91 that is configured by a cable connection utilizing Universal Serial Bus (USB) protocol is described as an example in the present embodiment.

The relay device 200 is connected to the facility-device management apparatus 100 via the connection line 91, and data may be transmitted and received between both of the device and the apparatus. Further, the relay device 200 is connected to an intra-facility LAN 92. The intra-facility LAN 92 is a LAN in conformity to a protocol such as Ethernet® and Transmission Control Protocol and Internet Protocol (TCP/IP), and is connected to the Internet 93. The relay device 200 is connected, via the intra-facility LAN 92, to the Internet 93 and communicates with an external device connected to another LAN that is connected to the Internet.

The remote monitoring server 300 is a computer device that receives, from the facility-device management apparatus 100, the operation data stored therein. The remote monitoring server 300 is connected to the Internet 93 via a server LAN 94. The remote monitoring server 300, by way of the LAN 94, the Internet 93, and the intra-facility LAN 92, receives the operation data transmitted by the relay device 200 and transmits any necessary data (instructions requesting operation data, for example) to the relay device 200.

The facility-device management apparatus 100 has a function to transmit operation data to the remote monitoring server 300 via the intra-facility LAN 92 when the facility-device management apparatus 100 is directly connected to the intra-facility LAN 92. In other words, the facility-device management apparatus 100 is capable of generating, based on the operation data, LAN protocol-based data (first-protocol transmission data) to be transmitted to the remote monitoring server 300, and transmitting the LAN protocol-based data to the remote monitoring server 300. However, when a network (Internet 93) connectable to the outside exists between the remote monitoring server 300 and the facility-device management apparatus 100, conceivably, the facility-device management apparatus 100 might become exposed to a threat via the network. Therefore, in the present embodiment, the facility-device management apparatus 100, as illustrated in FIG. 1, is not directly connected to the intra-facility LAN 92. The facility-device management apparatus 100, via the relay device 200, is indirectly connected to the intra-facility LAN 92 and performs data communication with the remote monitoring server 300 via the relay device 200.

The relay device 200 transfers, to the remote monitoring server 300, data received from the facility-device management apparatus 100 via the connection line 91. Here, the connection line 91 (connection in accordance with the USB standard regulated protocol) and the intra-facility LAN 92 (connection in accordance with Ethernet® regulated protocol) do not use the same protocol. Therefore, during transferring, the relay device 200 converts the data (second-protocol transmission data) received from the facility-device management apparatus 100 via the connection line 91 into data (first-protocol transmission data) in conformity to the protocol of the intra-facility LAN 92, and transmits the converted data to the remote monitoring server 300 via the intra-facility LAN 92.

Figure 2:
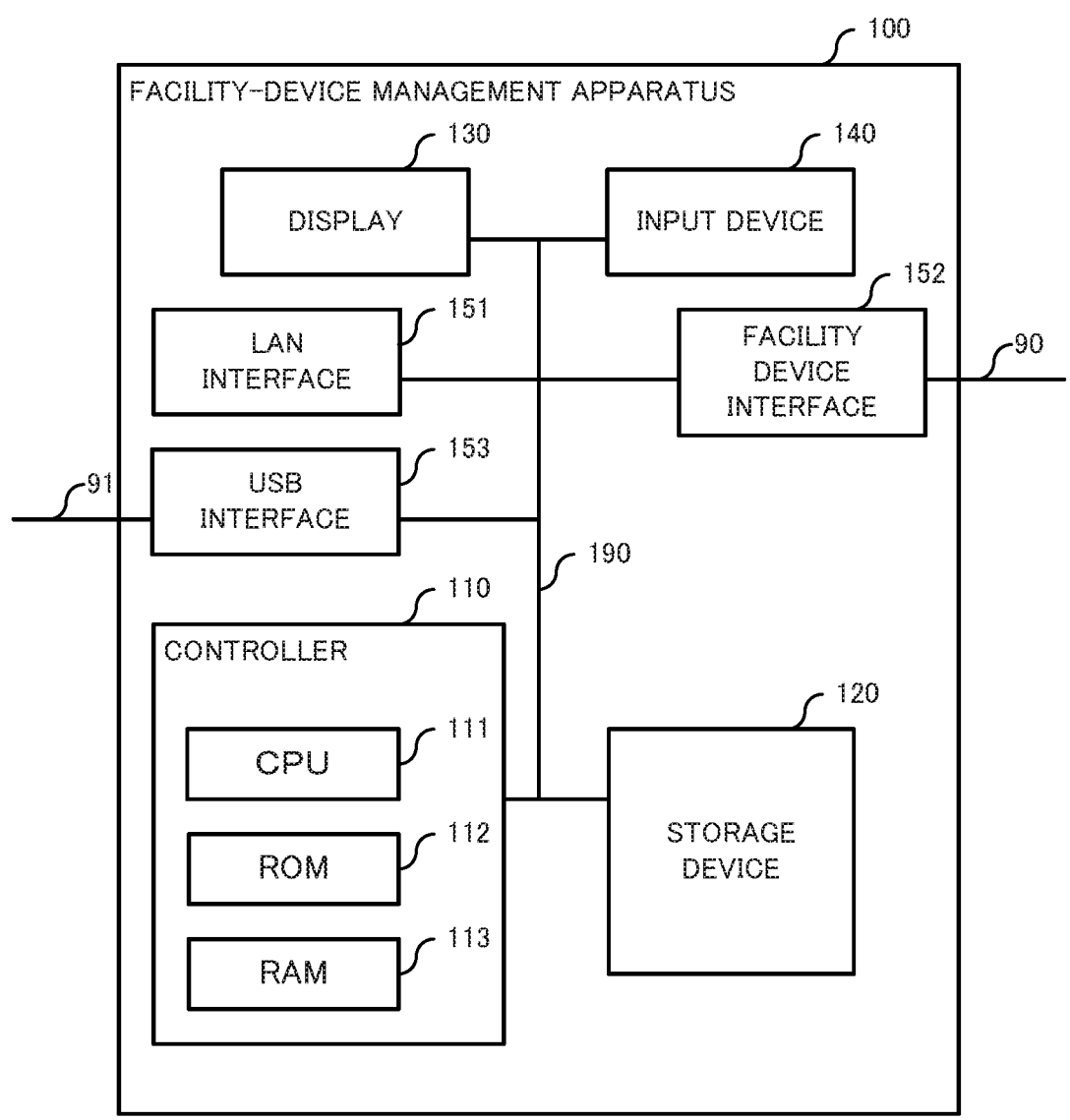
FIG. 2 is a block diagram illustrating hardware a configuration of a facility-device management apparatus.

The hardware configuration of the facility-device management apparatus 100 includes components illustrated in FIG. 2. That is, the facility-device management apparatus 100 includes a controller 110 that controls overall operations of the facility-device management apparatus 100, a storage device 120 that stores data necessary for the controller 110 operations, a display 130 for providing information necessary for an operator of the facility-device management apparatus 100, and an input device 140 for accepting operation inputs made by the operator. For interfacing with other devices, the facility-device management apparatus 100 further includes a LAN interface 151, a facility device interface 152, and a USB interface 153. Each of the components (controller 110, storage device 120, display 130, input device 140, LAN interface 151, facility device interface 152, and USB interface 153) of the facility-device management apparatus 100 is mutually connected with one another via an internal bus 190.

The controller 110 includes, for example, a central processing unit (CPU) 111, a read only memory (ROM) 112, and a random access memory (RAM) 113. The controller 110 controls the overall operations of the facility-device management apparatus 100 by executing the program stored in the ROM 112 or the RAM 113. As necessary, the controller 110 retrieves data such as a program from the storage device 120, or saves data onto the storage device 120.

The storage device 120 includes a storage device such as a hard disk drive, flash memory, and/or the like and stores, in accordance with a control of the controller 110, data necessary for running the facility-device management apparatus 100.

The display 130 includes a display device that is a liquid crystal display, a cathode ray tube, or the like and displays information to be presented to the operator of the facility-device management apparatus 100. Also, the input device 140 includes a keyboard, mouse, and/or the like and accepts operation inputs made by the operator and provides the controller 110 with the operation inputs. For example, the display 130 presents, to the operator of the facility-device management apparatus 100, information necessary for monitoring and controlling the facility devices. Also, the input device 140 accepts operation inputs made by the operator for monitoring and controlling the facility devices and provides the controller 110 with the operation inputs.

The facility-device management apparatus 100 includes a device, represented by the liquid crystal touch panel, that realizes both the function of displaying a screen and the function of accepting an operation with respect to the screen that is displayed, and this device may provide the function of the display 130 together with the function of the input device 140.

The LAN interface 151 has a function of connecting the facility-device management apparatus 100 to a LAN that is compliant with protocol such as Ethernet (registered trademark) and TCP/IP. The facility-device management apparatus 100 transmits the operation data to the remote monitoring server 300 via the LAN interface 151.

The facility device interface 152 connects the facility-device management apparatus 100 to the facility device network 90. The facility-device management apparatus 100 is connected to each of the facility devices via the facility device network 90 and acquires operation data of each of the facility devices. The facility device network 90 may be a general-use LAN configurable using any protocol or may be a network using a specific protocol.

The USB interface 153 connects the facility-device management apparatus 100 to the relay device 200 via the connection line 91. The connection line 91 is a USB standard based general-purpose cable. The facility-device management apparatus 100, via the connection line 91, transmits data to the relay device 200 and receives data transmitted by the relay device 200.

Figure 3:
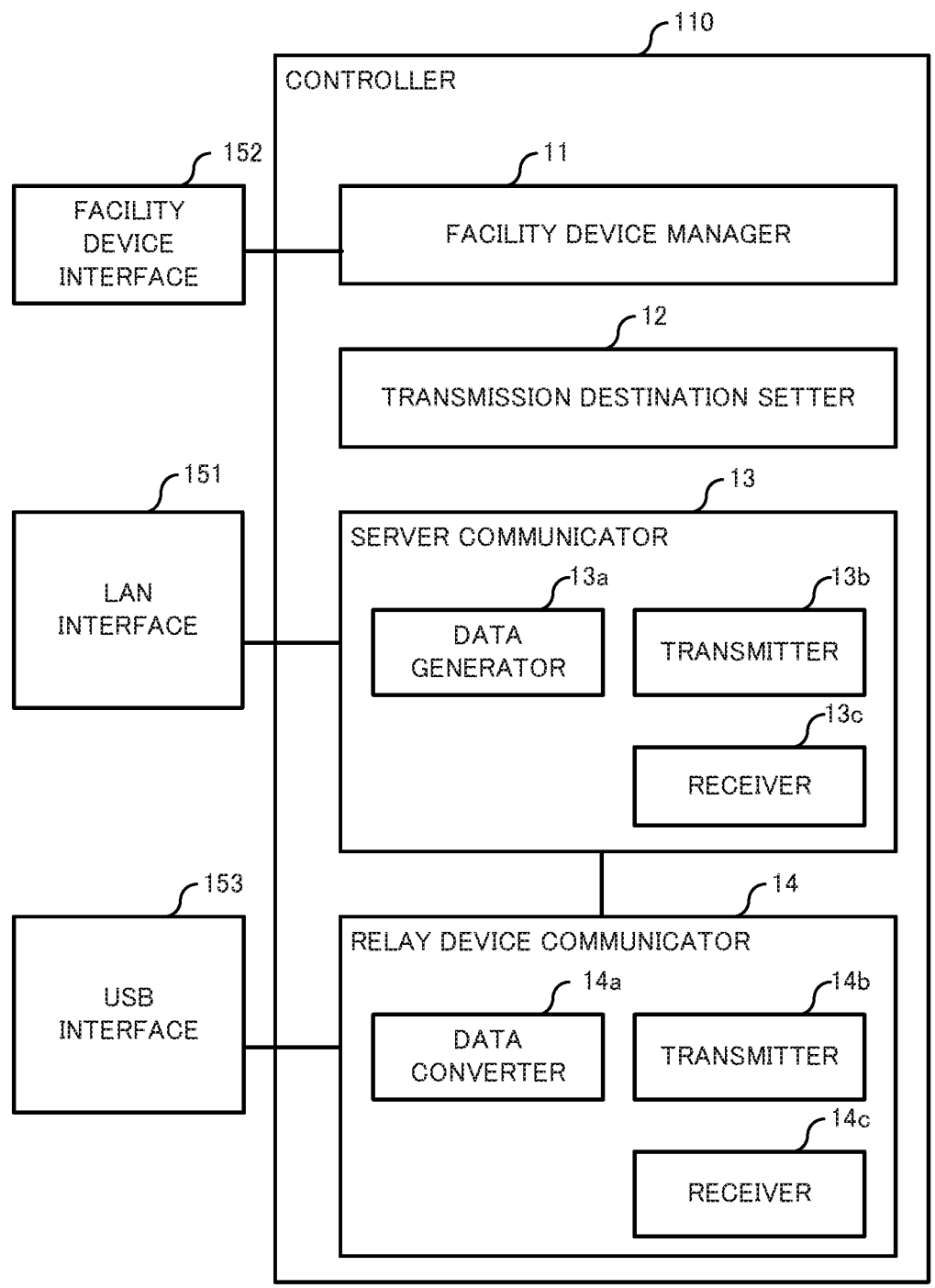
FIG. 3 is a block diagram illustrating a functional configuration implemented by a controller of the facility-device management apparatus.

The controller 110 implements the functional components illustrated in FIG. 3, as internal functions of the facility-device management apparatus 100. That is, the controller 110 includes a facility device manager 11 for managing each of the facility devices via the facility device interface 152, a transmission destination setter 12 for setting a transmission destination for the operation data, a server communicator 13 for communicating with the remote monitoring server 300 via the LAN interface 151, and a relay device communicator 14 for communicating with the relay device 200 via the USB interface 153.

The facility device manager 11 manages each of the facility devices connected via the facility device interface 152 and the facility device network 90 to the facility device manager 11. Specifically, the facility device manager 11, on a cyclical basis, acquires, from each of the facility devices, data indicating the running state (power consumption, running environment (set temperature and airflow strength), and the like) of the corresponding facility device and stores the acquired data as operation data. The facility device manager 11 acquires error information transmitted by a facility device when an error occurs in the facility device, and stores the error information as operation data and also stores the error information as operation data. Also, facility device manager 11 may acquire data indicating the running state from each of the facility devices based on operation details inputted via the input device 140. The facility device manager 11 may also display the operation data on the display 130 based on inputted operation details.

The transmission destination setter 12 sets the transmission destination for the operation data of the facility-device management apparatus 100. Specifically, the storage device 120, which is described in detail below, stores information indicating the destination of the operation data.

The server communicator 13 transmits the stored operation data to the remote monitoring server 300 via the LAN interface 151. Specifically, the server communicator 13 includes a data generator 13a that generates TCP/IP protocol-compliant data (first-protocol transmission data) based on the stored operation data, a transmitter 13b that transmits data of the TCP/IP protocol via the LAN interface 151, and a receiver 13c that receives data of the TCP/IP protocol via the LAN interface 151.

The data generator 13a extracts, from the operation data stored in the storage device 120, data to be reported to the remote monitoring server 300. Any extraction criteria may be used. The data generator 13a, for example, extracts from the stored operation data, data of a particular period of time including the point of time when extraction processing is performed (for example, a period of time from one week before the point of time of extraction to the point of time of extraction) or data not yet reported to the remote monitoring server 300. The data generator 13a generates data (first-protocol transmission data) based on TCP/IP protocol to be transmitted to the remote monitoring server 300 by modifying the data to conform to the format of TCP/IP protocol (affixing a header that conforms to TCP/IP protocol, for example).

The transmitter 13b transmits data of the TCP/IP protocol via the LAN interface 151. More particularly, the transmitter 13b transmits the data that is generated by the data generator 13a based on the operation data. Further, the receiver 13c receives data of TCP/IP protocol via the LAN interface 151.

Upon the data generator 13a generating the TCP/IP protocol-compliant data that is to be transmitted remote monitoring server 300, the server communicator 13 fetches, from the storage device 120, the information indicating the transmission destination of the operation data set by the transmission destination setter 12. As long as fetched information contains the information indicating the remote monitoring servicer 300 as the transmission destination, the data generated by the data generator 13a is transmitted by the server communicator 13, via the transmitter 13b. Conversely, when the fetched information does not contain the information indicating the remote monitoring server 300 as the transmission destination, the server communicator 13 transmits the data generated by the data generator 13a to the relay device communicator 14.

The relay device communicator 14 performs communication with the relay device 200 via the USB interface 153 and the connection line 91. More particularly, the relay device communicator 14 receives the data transmitted by the server communicator 13, performs protocol conversion, and then transmits the converted data to the relay device 200. In order to implement these functions, the relay device communicator 14 includes a data converter 14a that converts TCP/IP protocol-compliant data into USB protocol-compliant data and vice versa. The relay device communicator 14 also includes a transmitter 14b that transmits data by USB protocol to the relay device 200 via the USB interface 153 and a receiver 14c that receives data by USB protocol from the relay device 200 via the USB interface 153.

The data converter 14a receives the data (TCP/IP protocol-compliant data) transmitted by the server communicator 13 and converts the received data into USB protocol format data. The data transmitted by the server communicator 13 is TCP/IP protocol-compliant data generated by the data generator 13a. The data converter 14a analyzes the received data, and separates, from among the analyzed data, a portion corresponding to the operation data to be transmitted to the remote monitoring server 300 and a portion that is distinctly TCP/IP protocol (TCP/IP protocol header, delimiters and the like). From the received data, the data converter 14a discards the portion that is distinctly TCP/IP protocol, and then adds a header to the portion corresponding to the operation data to be transmitted to the remote monitoring server 300, so as to be data in a USB protocol compliant format. In this manner, the data converter 14a converts the TCP/IP-compliant protocol data into USB protocol-compliant data.

The transmitter 14b and the receiver 14c communicate with the relay device 200 via the USB interface 153 and the connection line 91 using USB protocol. More particularly, the transmitter 14b transmits to the relay device 200 the data converted by the data converter 14a into USB protocol data. Also, the receiver 14c receives the data transmitted by the relay device 200.

Figure 4:
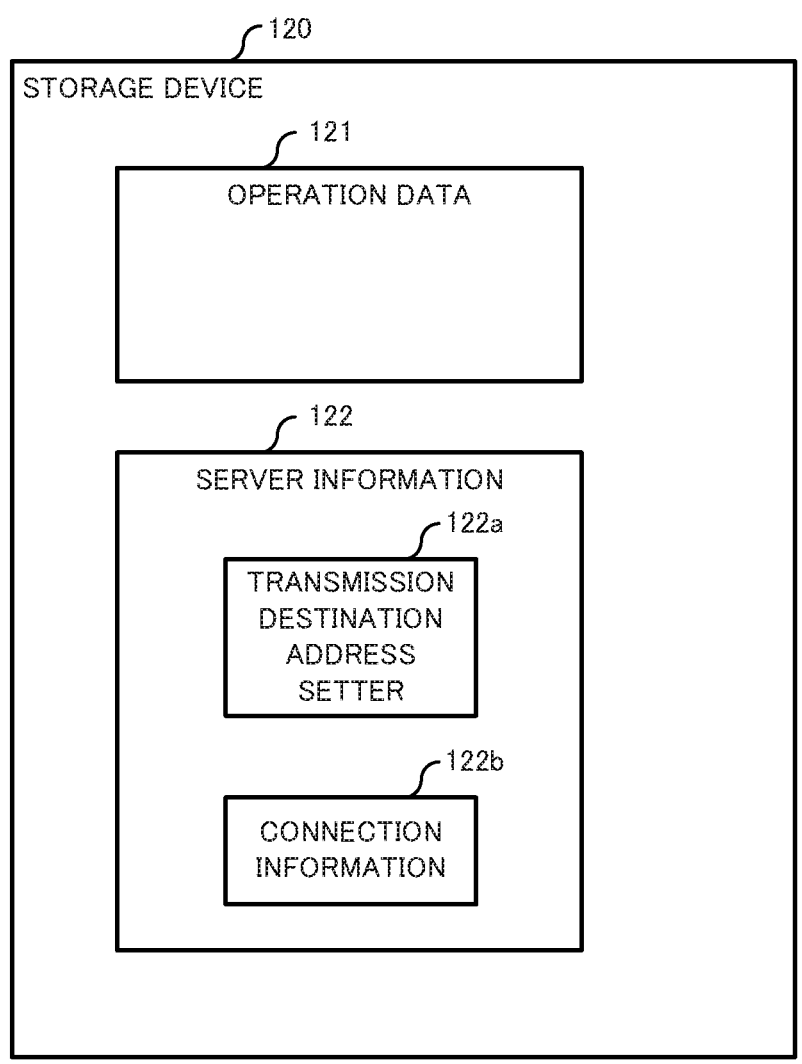
FIG. 4 is a diagram illustrating data content stored in the storage device.

The facility-device management apparatus 100 stores the data indicated in FIG. 4 into the storage device 120. That is, the storage device 120 stores operation data 121 containing the operation information of the facility device, and stores server information 122 containing the information regarding the remote monitoring server 300 that is the report destination of operation data.

The operation data 121 is data containing operation information of facility devices managed by the facility-device management apparatus 100. The facility-device management apparatus 100 uses the function of the facility device manager 11 to acquire information regarding operation from each of the facility devices and store the acquired information into the operation data 121. The operation data 121 contains information of, for example, a facility device regarding the starting of operation and stopping of operation, operation modes (cooling and heating, for example), setting temperature, indoor temperature, and event information indicating when an event, such as an error, occurred, and also contains detail data that is used when performing maintenance on a facility device. The facility device manager 11, on a periodic basis or when an event occurs, acquires operation-related information from a facility device, and then updates the operation data 121. Also, the data generator 13a refers to the operation data 121 to generate report data to be reported to the remote monitoring server 300.

The server information 122 is data containing information for transmitting report data generated based on the operation data 121 to the remote monitoring server 300 by the facility-device management apparatus 100. The server information 122 contains a transmission destination address setting 122a and connection information 122b.

The transmission destination address setting 122a is data indicating information set as a destination of the report data. For example, when an Internet Protocol (IP) address of the remote monitoring server 300 is contained in the transmission destination address setting 122a, the server communicator 13 transmits data of TCP/IP protocol generated based on the operation data 121, via the LAN interface 151. Also, the data contained in the transmission destination address setting 122a is not limited to IP addresses. A uniform resource locator (URL), indicating the location of the remote monitoring server 300 on the Internet, may be contained in the transmission destination address setting 122a, for example.

Also, when a local loopback address that is different from the IP address of the remote monitoring server 300 is contained in the transmission address setting 122a, the server communicator 13 does not transmit report data generated by the data generator 13a to the outside via the LAN interface 151. The local loopback address is a type of IP address that indicates the transmission destination is the apparatus itself. When the local loopback address is contained in the transmission destination address setting 122a, the server communicator 13 transmits the report data generated by the data generator 13a to the relay device communicator 14 inside the apparatus itself (facility-device management apparatus 100). The relay device communicator 14 receives and converts the report data TCP/IP protocol-compliant report data into data of USB protocol-compliant format and then forwards the data by USB protocol to the relay device 200 via the USB interface 153 (and connection line 91). That is, when the local loopback address is contained in the transmission destination address setting 122a, the facility-device management apparatus 100a transmits the report data to the relay device 200 via the USB interface 153, instead of transmitting the report data to the remote monitoring server 300 via the LAN interface 151.

The facility-device management apparatus 100 includes the previously described transmission destination setter 12 and provides the operator with a way to input data of the transmission destination address setting 122a. That is, the transmission destination setter 12 contains information input by the operator via the input device 140 into the transmission destination address setting 122a. When the operator inputs data (IP address or URL of the remote monitoring server 300) directly indicating the location of the remote monitoring server 300 on the Internet, the transmission destination setter 12 sets the facility-device management apparatus 100 to transmit the report data to the remote monitoring server 300. Conversely, when the operator inputs the local loopback address, the transmission destination setter 12 sets the facility-device management apparatus 100 not to transmit the report data to the remote monitoring server 300. That is, the transmission destination setter 12 functions as setting means for setting whether or not the facility-device management apparatus 100 is to transmit report data to the remote monitoring server 300. Also, the transmission destination setter 12 may be regarded as selection means for selecting which of the remote monitoring server 300 and the relay device 200 is to be transmitted the report data.

The connection information 122b is data necessary for transmitting report data to the remote monitoring server 300. The connection information 122b contains information necessary for connecting to the remote monitoring server 300, for example, authentication information (username and password) a port number, an application layer protocol such as Hypertext Transfer Protocol (HTTP) or Simple Mail Transfer Protocol (SMTP), and the host name of the facility-device management apparatus 100. When the transmitter 13b of the server communicator 13 is to transmit the report data to the remote monitoring server 300, the transmitter 13b appropriately refers to the connection information 122b and either adds to the report data any data that is necessary, or transmits the necessary data prior to transmitting the report data. Also, when the transmitter 14b of the relay device communicator 14 is to transmit report data to the relay device 200, the transmitter 14b likewise refers to the connection information 122b and either adds to the report data any data that is necessary, or transmits the necessary data prior to transmitting the report data.

Figure 5:
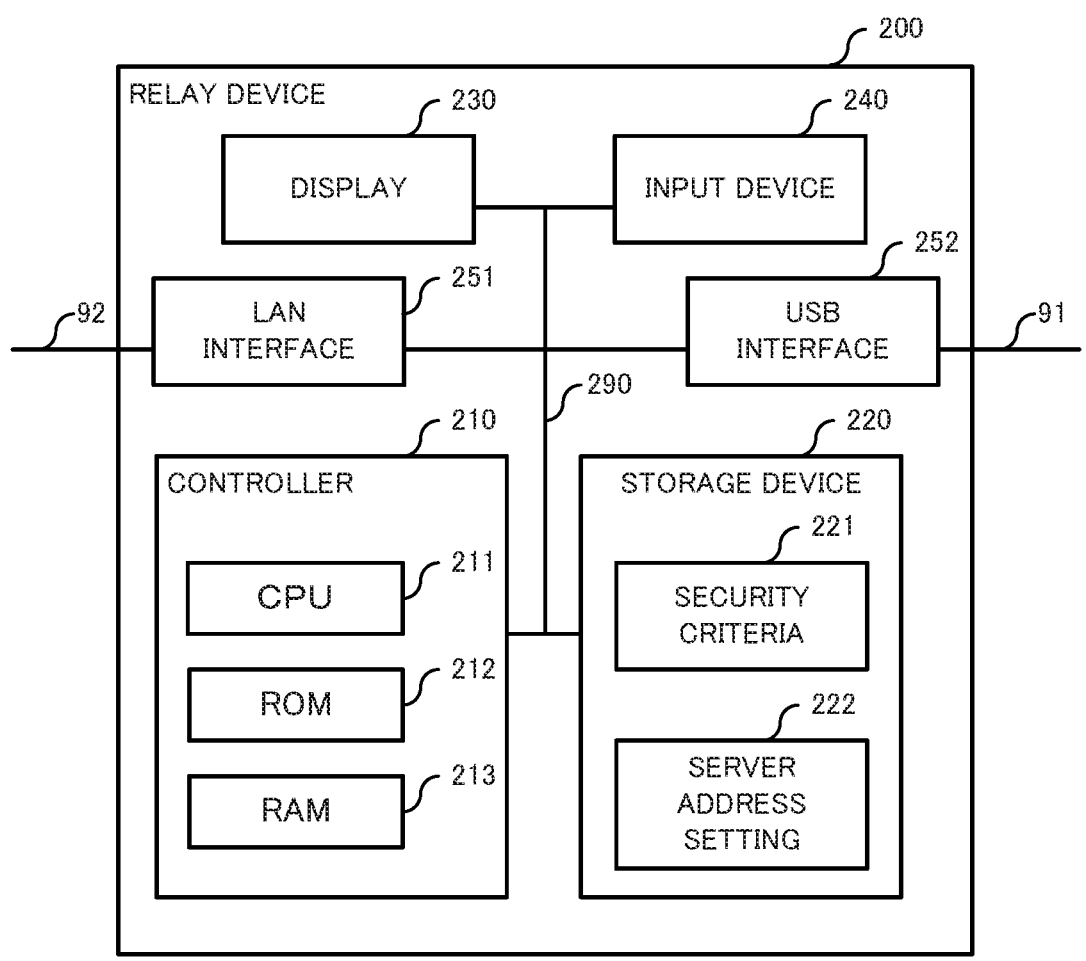
FIG. 5 is a block diagram illustrating a hardware configuration of a relay device.

The hardware configuration of the relay device 200 includes components illustrated in FIG. 5. That is, the relay device 200 includes a controller 210 that controls overall operations of the relay device 200, a storage device 220 that stores data information necessary for the controller 210 operations, a display 230 for providing information necessary for an operator of the relay device 200, and an input device 240 for accepting operation inputs made by the operator. For interfacing with other devices, the relay device 200 also includes a LAN interface 251 and a USB interface 252. Each of the components (controller 210, storage device 220, display 230, input device 240, LAN interface 251, and USB interface 252) of the relay device 200 is mutually connected with one another via an internal bus 290. The controller 210, the display 230, the input device 240, and the internal bus 290 are the same as the identically named hardware components in the facility-device management apparatus 100, and a description thereof is therefore omitted.

The LAN interface 251 has a function of connecting the relay device 200 to a LAN that is compliant with protocol such as Ethernet® and TCP/IP. The relay device 200 transmits report data to the remote monitoring server 300 via the LAN interface 251. Further, the relay device 200 receives data, via the LAN interface 251, from another device connected to the intra-facility LAN 92 or from yet another device connected with the relay device 200 via the Internet 93.

The USB interface 252 connects the relay device 200 with the facility-device management apparatus 100 via the connection line 91. The facility-device management apparatus 100, via the connection line 91, transmits data to the relay device 200 and receives data transmitted by the relay device 200.

The storage device 220 includes a storage device such as a hard disk drive, flash memory, and/or the like and stores, in accordance with a control of the controller 210, data necessary for running the relay device 200. More particularly, the storage device 220 stores security criteria 221 and a server address setting 222.

The security criteria 221 contains information indicating what data among the data received by the relay device 200 via the LAN interface 251 may be forwarded to the facility-device management apparatus 100. For example, the security criteria may be set such that only acknowledgement data from the remote monitoring server 300 in response to report data transmitted by the relay device 200, via the LAN interface 251, to the remote monitoring server 300 may be forwarded to the facility-device management apparatus 100. As another acceptable alternative, only data associated with verification of the remote monitoring server 300 may be forwarded to the relay-device management apparatus 100. The relay device 200 may use any criteria as the security criteria 221.

The server address setting 222 is information indicating the location on the Internet of the remote monitoring server 300 that is the destination of the report data. The server address setting 222 contains the IP address or the URL of the remote monitoring server 300.

Figure 6:
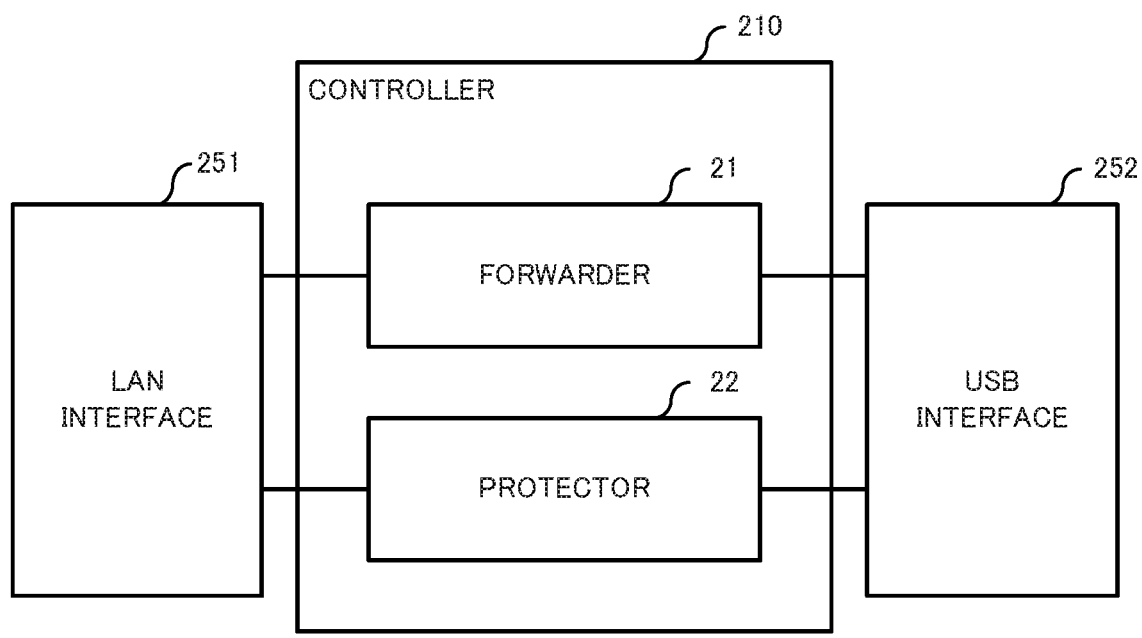
FIG. 6 is a block diagram illustrating a function configuration to be implemented by a controller of the relay device according to Embodiment 1.

The controller 210 implements each of the functional components illustrated in FIG. 6, as the internal functions of the relay device 200. That is, the controller 210 includes a forwarder 21 that converts report data received from the relay device 200 into a TCP protocol format and transmits the data of TCP protocol to the remote monitoring server 300. Further, the controller 210 includes a protector 22 that extracts, from the data received by the LAN interface 251, data (secure data) that meets the security criteria 221, converts the extracted data into the USB protocol format, and then transmits the USB protocol format data via the USB interface 252.

The forwarder 21 receives report data from the relay device 200 via the USB interface 252. Further, upon receipt of the report data, the forwarder 21 fetches the server address setting 222 of the storage device 220 and acquires the IP address of the remote monitoring server 300. The forwarder 21 converts the received report data (USB protocol format) into TCP/IP protocol format. When doing so, the IP address acquired from the remote monitoring server 300 is added to the portion, indicating the transmission destination IP address, in the header of the report data. The forwarder 21 transmits the report data that is in TCP/IP protocol format to the network via the LAN interface 251. The transmitted report data reaches the remote monitoring server 300 via the intra-facility LAN 92.

The protector 22 extracts the data (secure data) that meets the security criteria 221 from the data received by the LAN interface 251 and transmits the extracted data to the facility-device management apparatus 100 via the USB interface 252. For example, in a case where the security criteria 221 is set such that only acknowledgement data from the remote monitoring server 300, in response to report data transmitted by the relay device 200, may be forwarded to the remote monitoring server 300, the protector 22 transmits, via the USB interface 252, data received only when the received data is acknowledgement data from the remote monitoring server 300. The protector 22 fetches the data from the storage device 220 when, for example, the relay device 200 is powered on. Upon receipt of data via the LAN interface 251, the protector 22 extracts data that meets the fetched secure data criteria and transmits the extracted data via the USB interface 252 to the facility-device management apparatus 100.

By the heretofore described facility-device management apparatus 100 and the relay device 200 operating cooperatively, the control system 1 according to the present embodiment transmits, to the remote monitoring server 300, the report data (first protocol data) generated based on the operation data acquired from the facility device. The relay device 200 that includes the protector 22 extracts data that meets the security criteria 221 and transmits the extracted data to the facility-device management apparatus 100. Since the facility-device management apparatus 100 is not directly connected to the Internet 93 and only receives data extracted in the relay device 200, a high security level can be easily maintained.

Figure 7:
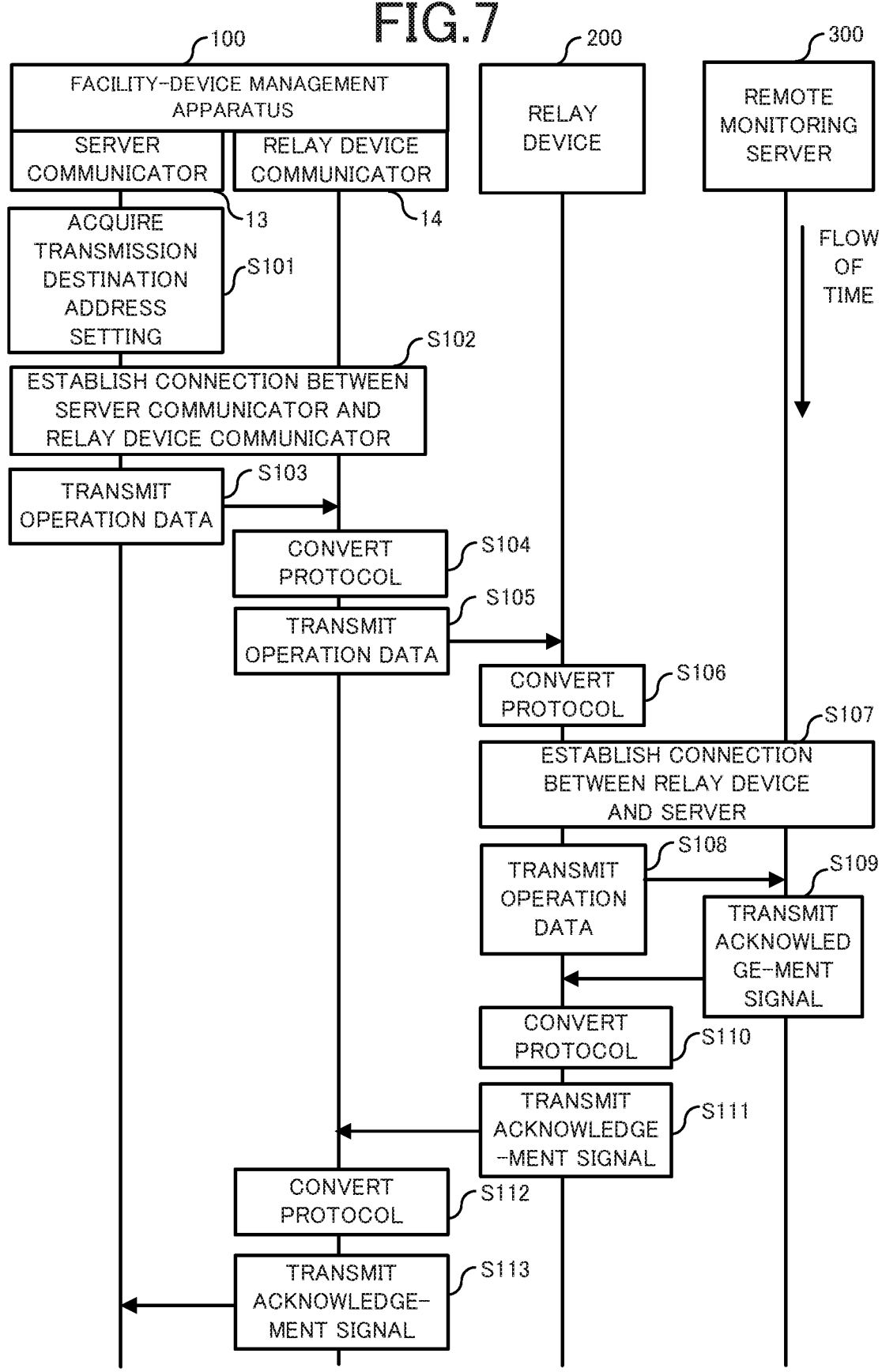
FIG. 7 is a diagram illustrating a data flow example occurring when the control system transmits operation data to a remote monitoring server.

FIG. 7 is a diagram illustrating the flow of data occurring when the facility-device management apparatus 100 reports operation data to the remote monitoring server 300 via the relay device 200. In such a case, the transmission destination address setting 122*a* of the facility-device management apparatus 100 contains data indicating the local loopback address. That is, for the case indicated in FIG. 7, the facility-device management apparatus 100 is set not to transmit the first protocol report data to the remote monitoring server 300.

When an event (such as arrival of a transmission deadline, an operation input by the operator requesting transmission of report data, or detection of an error) setting for report data to be generated occurs, the facility-device management apparatus 100 generates, based on the operation data 121, report data (first protocol data) that is to be reported to the remote monitoring server 300. The facility-device management apparatus 100 transmits the operation data to the remote monitoring server 300 via the relay device 200 in accordance with the data flow illustrated in FIG. 7.

The server communicator 13 of the facility-device management apparatus 100 acquires the transmission destination address setting (step S101). The server communicator 13 refers to the transmission address setting 122*a* in the storage device 120 and acquires information (in this case, the local loopback address) indicating the transmission destination of the report data.

Next, the server communicator 13 establishes a connection with the relay device communicator 14 (step S102). Since the acquired information indicating the transmission destination of the report data is information indicating the apparatus itself (that is, the relay device communicator 14), the server communicator 13 transmits, to the relay device communicator 14 in the apparatus itself, a signal indicating connection request. The relay device communicator 14 acknowledges the received signal indicating connection request and transmits a signal indicating connection permission. The server communicator 13 establishes connection with the relay device communicator 14 upon completion of this process.

Next, the server communicator 13 transmits the operation data to the relay device communicator 14 (step S103). The server communicator 13 transmits report data generated based on TCP/IP protocol to the relay device communicator 14.

The relay device communicator 14 performs protocol conversion on the received report data (step S104). The relay device communicator 14 extracts, from the report data that is TCP/IP protocol format, the data corresponding to the operation data. The relay device communicator 14 modifies (affixes a proper header, for example) the extracted data such that the data conforms to USB protocol.

Next, the relay device communicator 14 transmits the operation data that is in a format compliant with USB protocol to the relay device 200 via the connection line 91 (step S105).

Upon receipt of the operation data, the relay device 200 performs protocol conversion on the received operation data (step S106). The relay device 200 modifies (deletes the USB protocol header and affixes the proper header) the USB protocol-compliant formatted operation data (second-protocol transmission data) to conform to TCP/IP protocol. The relay device 200 also fetches the server address setting 222 from the storage device 220 and inserts the server address setting 222 into the transmission destination address of the TCP/IP header.

Next, the relay device 200 establishes connection with the remote monitoring server 300 (step S107). The relay device 200 fetches the server address setting 222 from the storage device 220 and acquires information indicating the location of the remote monitoring server 300 on the Internet. The relay device 200 transmits, based on the acquired information, a signal indicating a connection request, to the remote monitoring server 300. The remote monitoring server 300 acknowledges the received signal indicating a connection request and transmits a signal indicating connection permission. Upon completion of this process, the relay device 200 establishes connection with the remote monitoring server 300.

Next, the relay device 200 transmits, to the remote monitoring server 300, the operation data converted into a format that conforms to TCP/IP protocol (step S108).

The remote monitoring server 300 having received the operation data from the relay device 200 transmits an acknowledgement signal in response to the received operation data (step S109).

Upon receipt of the acknowledgement signal from the remote monitoring server 300, the relay device 200 performs protocol conversion on the acknowledgement signal (step S110). The relay device 200 converts the acknowledgement signal from TCP/IP protocol format to USB protocol format.

Next, the relay device 200 transmits the acknowledgement signal converted into USB protocol to the relay device communicator 14 of the facility-device management apparatus 100 via the connection line 91 (step S111).

Upon receipt of the acknowledgement signal from the relay device 200, the relay device communicator 14 performs protocol conversion on the acknowledgement signal (step S112). The relay device communicator 14 converts the received acknowledgement signal from USB protocol format to TCP/IP protocol format.

Next, the relay device communicator 14 transmits, to the server communicator 13, the acknowledgement signal converted into TCP/IP protocol format (step S113).

In the process from step S101 through step S113, the server communicator 13 transmits, to the remote monitoring server 300, the report data (first-protocol transmission data) generated based on the operation data and receives the acknowledgement signal from the remote monitoring server 300. That is, the control system 1 reports the report data generated based on the operation data to the remote monitoring server 300 by performing this processing.

In a case where the facility-device management apparatus 100 transmits the report data via the LAN interface 151 directly to the remote monitoring server 300 without relaying of the report data by the relay device 200, the server communicator 13 performs a process corresponding to the aforementioned steps S101 to S103 and step S113. That is, the server communicator 13, in this case, acquires the IP address or URL of the remote monitoring server 300 from the transmission destination address setting 122*a* (corresponding to step S101), establishes connection with the remote monitoring server 300 (corresponding to step S102), and transmits the report data to the remote monitoring server 300 (corresponding to step S103). Upon receipt of the transmitted report data, the remote monitoring server 300 transmits an acknowledgement signal to the server communicator 13 (corresponding to step S113).

When the transmission destination address setting 122*a* contains information (IP address or URL) indicating the location of the remote monitoring server 300 on the Internet (that is, when a setting is made to transmit report data by TCP/IP protocol to the remote monitoring server 300), the server communicator 13 transmits the report data via the LAN interface 151 to the remote monitoring server 300. Conversely, when the transmission destination address setting 122a contains a local loopback address (that is, when a setting is made not to transmit the report data by TCP/IP protocol to the remote monitoring server 300), the server communicator 13 transmits the report data to the relay device communicator 14. The relay device communicator 14 converts the received report data received in TCP/IP protocol into report data compliant with USB protocol, and transmits the report data by USB protocol to the relay device 200 via the USB interface 153.

When the relay device 200 or the server communicator 13 transmits report data to the remote monitoring server 300, any protocol may be used in the application layer. Examples of acceptable protocols include Hypertext Transfer Protocol (HTTP), Simple Mail Transfer Protocol (SMTP), and File Transfer Protocol (FTP). Also, the control system 1 according to the present embodiment may implement a protocol that uses User Datagram Protocol (UDP) instead of TCP.

In the present embodiment, the transmission destination setter 12 adds, to the transmission destination address setting 122a, the content inputted via the input device 140 by the operator of the facility-device management apparatus 100, and thereby sets whether or not the facility-device management apparatus 100 is to transmit the report data to the remote monitoring server 300. However, the present embodiment is not limited to this example. The transmission destination setter 12 may instead determine whether the LAN interface 151 of the facility-device management apparatus 100 is connectable or not-connectable to the remote monitoring server 300, and when determining that connection is not possible, the transmission destination setter 12 may set such that the facility-device management apparatus 100 does not transmit the report data to the remote monitoring server 300.

Specifically, in addition to the transmission destination address setting 122a, the facility-device management apparatus 100 also stores, into the storage device 120, direct transmission flag data indicating whether or not the facility-device management apparatus 100 is to transmit the report data to the remote monitoring server 300. The transmission destination setter 12 also stores the IP address or the URL of the remote monitoring server 300 into the transmission destination address setter 122a. When the facility-device management apparatus 100 generates the report data, the transmission destination setter 12 verifies connectivity with the remote monitoring server 300 via the LAN interface 151. Specifically, the transmission destination setter 12 issues a type of command called ping-command to the IP address stored in the transmission destination address setting 122a. When an arrival acknowledgement in response to the issued ping-command is returned from the destination address, the transmission destination setter 12 sets the direct transmission flag data to ON. Conversely, if an arrival acknowledgement is not returned from the destination address in response to the ping-command within a given time period, the transmission destination setter 12 sets the direct transmission flag data to OFF.

After generating the report data, the server communication 13 refers to the direct transmission flag data and determines whether or not the facility-device management apparatus 100 is to transmit the report data to the remote monitoring server 300. When the direct transmission flag data is set as ON, the server communicator 13 transmits the report data via the LAN interface 151. Conversely, when the direct transmission flag data is set as OFF, the server communicator 13 transmits the report data to the relay device communicator 14.

In the example described thus far, the transmission destination setter 12 stores, into the storage 120, information indicating whether or not the facility-device management apparatus 100 is to transmit the report data to the remote monitoring server 300. However, the present embodiment is not limited to this example. The transmission destination setter 12, for example, may include a physical switch that may be toggled between ON and OFF to switch between a transmission and a non-transmission of the report data to the remote monitoring server 300. In this case, the operator of the facility-device management apparatus 100, for example, can toggle the switch to switch between transmission via the relay device 200 and transmission via the LAN interface 151, of the report data.

In the control system 1 according to the present embodiment, the relay device 200 that ensures security connects to the network (intra-facility LAN 92) connected to the Internet, whereas the facility-device management apparatus 100 does not connect directly to the intra-facility LAN 92. Using the control system 1 according to the present embodiment therefore can reduce the risk of the facility-device management apparatus 100 being attacked directly by an unauthorized user from an external device.

Also, the facility-device management apparatus 100 and the relay device 200 are connected to each other by the USB protocol connection line 91. The connection line 91 is a USB protocol dedicated connector that makes hacking into communications between the facility-device management apparatus 100 and the relay device 200 difficult from another device. Therefore, a high security level can be maintained in the network (connection line 91, facility-device management apparatus 100, and facility device network 90, and each facility device) beyond the relay device 200.

Also, the facility-device management apparatus 100 does not have an IP address in the intra-facility LAN 92. Therefore, replacing the facility-device management apparatus 100 does not result in extra work for the network administrator of the intra-facility LAN 92, thereby reducing the administration workload.

Modified Embodiment 1

In Embodiment 1, an example is described in which the control system 1, triggered by the occurrence of an internal event (such as arrival of a transmission deadline, an operation input by an operator, or occurrence of an event, for example), generates report data and transmits the report data to the remote monitoring server 300. However, the control system 1 may generate report data in response to a request from the remote monitoring server 300 instead and transmit the report data to the remote monitoring server 300. In Modified Embodiment 1, an example is described in which the control system 1 transmits report data in response to a request from remote monitoring server 300.

A data flow involving the control system 1 according to Modified Embodiment 1, occurring when the control system 1 reports operation data in response to a request from the remote monitoring server 300, is described with reference to FIG. 8.

After the remote monitoring server 300 transmits the request command (step S201), the relay device 200 receives the transmitted request command.

The relay device 200 refers to the security criteria 221 and when the received request command meets the security criteria 221, the relay device 200 performs protocol conversion on the received request command (step S202). The relay device 200 converts the received request command from TCP/IP protocol format to USB protocol format.

Next, the relay device 200 transmits the request command converted into USB protocol format to the relay device communicator 14 via the connection line 91 (step S203).

Upon receipt of the request command, the relay device communicator 14 performs protocol conversion on the received request command (step S204). The relay device communicator 14 converts the received request command from USB protocol format into TCP/IP protocol format.

Next, the relay device communicator 14 establishes connection with the server communicator 13 (step S205). The relay device communicator 14 transmits to the server communicator 13 a signal indicating a connection request. The server communicator 13 acknowledges the received signal indicating the connection request and transmits a signal indicating connection permission. Upon completion of this process, the relay device communicator 14 establishes connection with the server communicator 13.

Next, the relay device communicator 14 transmits the request command converted into TCP/IP protocol format to the server communicator 13 (step S206).

The server communicator 13 receives the request command, generates operation data in accordance with the request command, and transmits the operation data to the relay device communicator 14 (step S207). The server communicator 13 analyzes the received request command and determines the kind of data the remote monitoring server 300 is requesting to be extracted based on the operation data 121 and transmitted. The server communicator 13 generates, based on the operation data 121, operation data in accordance with the request command and generates TCP/IP protocol operation data. The server communicator 13 transmits the generated operation data to the relay device communicator 14.

Upon receipt of the operation data, the relay device communicator 14 performs protocol conversion on the received operation data (step S208). The relay device communicator 14 converts the received operation data from TCP/IP protocol format to USB protocol format.

Next, the relay device communicator 14 transmits the operation data converted into USB protocol format to the relay device 200 via the connection line 91 (step S209).

Upon receipt of the operation data, the relay device 200 performs protocol conversion on the received operation data (step S210). The relay device 200 converts the received operation data from USB protocol format into TCP/IP protocol format.

Next, the relay device 200 transmits the operation data converted into TCP/IP protocol format to the remote monitoring servicer 300 (step S211). Through this process, the operation data requested by the remote monitoring server 300 is transmitted from the control system 1 to the remote monitoring server 300.

Figure 8:
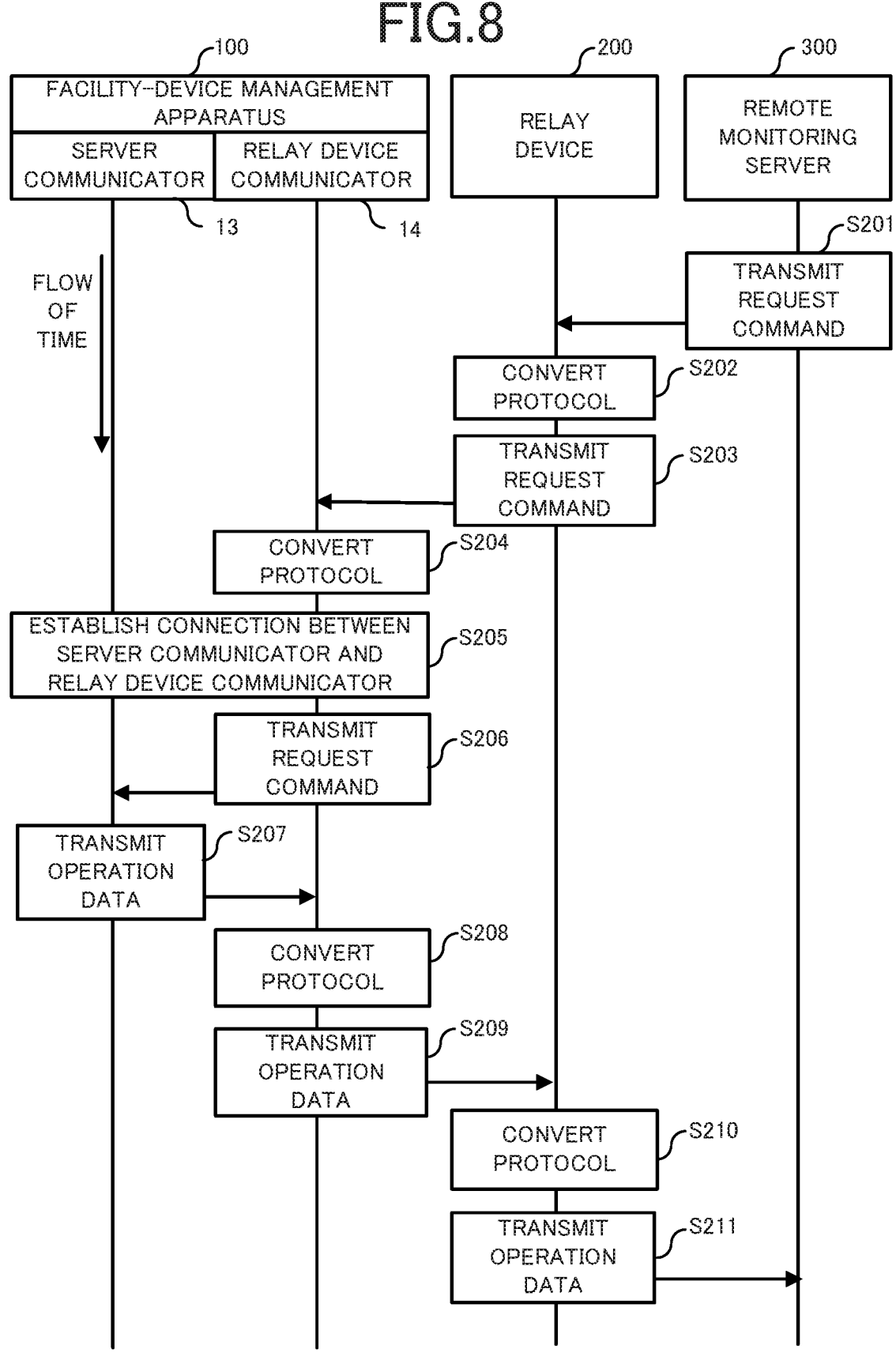
FIG. 8 is a diagram illustrating another data flow example occurring when the control system transmits operation data to the remote monitoring server.

When the operation data is transmitted to the remote monitoring server 300 in accordance with the data flow illustrated in FIG. 8, the relay device 200 extracts, from the data received via the LAN interface 251, secure data that meets the security criteria 221 and transmits the extracted secure data to the facility-device management apparatus 100. This enables the facility-device management apparatus 100 to be protected from outside threats.

Figure 9:
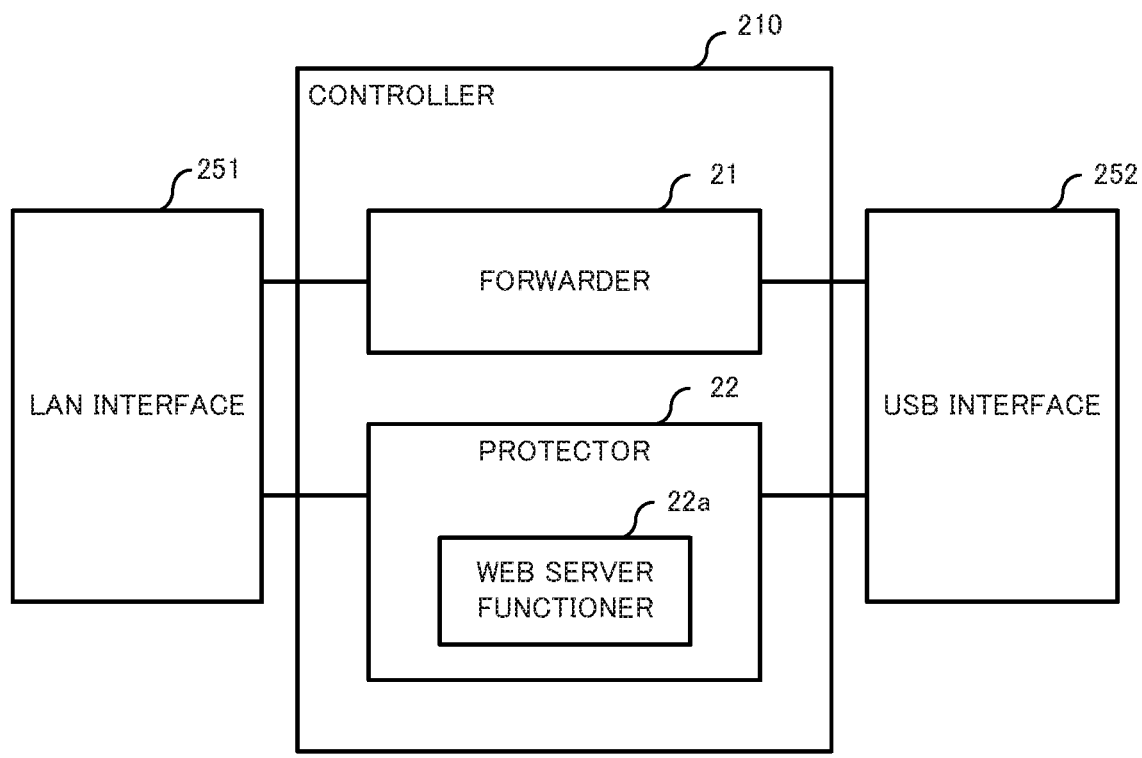
FIG. 9 is a block diagram illustrating a function configuration implemented by the controller of relay device according to Modified Embodiment 1.

Further, the relay device 200 includes a function to appropriately accept request commands from the outside. As one specific example, the controller 210 of the relay device 200 according to Modified Embodiment 1 implements a web server functioner 22a as a portion of the protector 22 as indicated in FIG. 9. The web server functioner 22a communicates with the web browser running on another device (remote monitoring server 300) and accepts a request command directed to the facility-device management apparatus 100. The web server functioner 22a extracts, from the received request command, the secure data that meets the security criteria 221 and transmits the extracted secure data to the facility-device management apparatus 100.

The inclusion of the web server functioner 22a within the protector 22 enables, for example, easy implementation of a security framework used by a common web server. For example, an existing web server already includes username and password-based authentication system. By implementing a username and password-based authentication system with the web server functioner 22a, any request command without a correct username and password is discarded, thereby protecting the facility-device management apparatus 100. In this case, the correct username and password are stored as a set in the security criteria 221.

Also, common web servers can communicate information not only with other devices via a network but also through a web browser running on a device itself. For example, setting the web server functioner 22a to communicate with a web browser running by the device itself (relay device 200) enables not the remote monitoring server 300 but rather the relay device 200 to acquire operation data. In this case, the operator of the relay device 200 can conveniently confirm the operation data of each facility device, via the display 130 provided by the relay device 200.

In the embodiment described above, the connection line 91 is a USB-based cable connection. However, any universal standard-based connection can be used as the connection line 91. Examples of acceptable connections may include Institute of Electrical and Electronics Engineers (IEEE)-based connections 1394, Recommended Standard (RS) 232C-based connections, and Bluetooth®-based connections.

Also, in the embodiment described above, the remote monitoring server 300 receives operation data transmitted by the relay device 200. However, a proxy server may be installed between the relay device 200 and the remote monitoring server 300. In this case, the relay device 200 transmits operation data to the proxy server and the proxy server transmits the received operation data to the remote monitoring server 300.

The programs executed by the facility-device management apparatus 100 or the relay device 200 in the aforementioned embodiments may be stored in a computer-readable recording medium such as a compact disk read-only memory (CD-ROM), a digital versatile disc (DVD), a magneto-optical disk (MO), a universal serial bus (USB) memory and a memory card and distributed By installation of this program in a dedicated or general-purpose computer, the computer can function as a device of the above-described embodiments.

The above-described program may be stored on a storage device of a server device on a communication network, such as the Internet, to enable the program to be downloaded to the computer, for example by superimposing the program onto a carrier wave. Moreover, the above-described processing can be achieved even by execution while the program is transferred through the communication network. Furthermore, the above-described processing can be achieved by executing all or part of the program on the server device, and executing the program while sending and receiving by the computer the information relating to such processing through the communication network.

Moreover, if the above-described functions are executed by sharing the functions between an operating system (OS) and application programs, or are executed by both the OS and the application programs in cooperation with each other, the non-OS portion alone may be stored in the above-described recording medium and distributed, or alternatively, may be, for example, downloaded to the computer.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

INDUSTRIAL APPLICABILITY

The present disclosure is suitable for a control system for reporting operation data of facility devices installed in a facility such as a building.

REFERENCE SIGNS LIST

1 Control system
2a to 2n Facility device
3 Facility
11 Facility device manager
12 Transmission destination setter
13 Server communicator
13a Data generator
13b Transmitter
13c Receiver
14 Relay device communicator
14a Data converter
14b Transmitter
14c Receiver
21 Forwarder
22 Protector
90 Facility device network
91 Connection line
92 Intra-facility LAN
93 Internet
94 Server LAN
100 Facility-device management apparatus
110, 210 Controller
111, 211 CPU
112, 212 ROM
113, 213 RAM
120, 220 Storage device
121 Operation data
122 Server information
122a Transmission destination address setting
122b Connection information
130, 230 Display
140, 240 Input device
151, 251 LAN interface
152 Facility device interface
153, 252 USB interface
190, 290 Internal bus
200 Relay device
221 Security criteria
222 Server address setting
300 Remote monitoring server

The invention claimed is:

1. A control system comprising:
a management apparatus configured to generate first-protocol transmission data based on operation data acquired from a facility device directly connected to the management apparatus; and
a relay device configured to communicate with a remote monitoring server via a network configured based on a first protocol, the relay device further configured to communicate with the management apparatus via a connection configured based on a second protocol different from the first protocol,
wherein the management apparatus comprises:
a controller and memory;
a setter configured to set whether or not to transmit the first-protocol transmission data to the remote monitoring server;
a first transmitter configured to transmit, when the first-protocol transmission data is set to be transmitted to the remote monitoring server, the first-protocol transmission data to the remote monitoring server; and
a second transmitter configured to, when the first-protocol transmission data is set not to be transmitted to the remote monitoring server, convert the first-protocol transmission data into second-protocol transmission data, and transmit the second-protocol transmission data to the relay device, and
wherein the relay device comprises:
a controller and memory different from the controller and memory of the management apparatus; and
a forwarder configured to receive the second-protocol transmission data from the management apparatus, convert the second-protocol transmission data into the first-protocol transmission data, and transmit the first-protocol transmission data to the network.

2. The control system according to claim 1, wherein
the relay device further comprises a protector configured to extract, from first protocol reception data received via the network, secure data that meets security criteria, and transmit the secure data to the management apparatus, and
the management apparatus further comprises a receiver configured to receive the secure data from the protector.

3. The control system according to claim 1, wherein the setter determines whether or not the first transmitter is connectable to the remote monitoring server, and when determining that the first transmitter is not connectable to the remote monitoring server, the setter sets not to transmit the first-protocol transmission data to the remote monitoring server.

4. The control system according to claim 2, wherein
the protector comprises a command acceptor that extracts, from the first protocol reception data, the secure data containing a command signal directed to the management apparatus, and transmits the secure data to the management apparatus, and
the management apparatus generates the first-protocol transmission upon receipt of the secure data containing the command signal.

5. The control system according to claim 1, wherein the relay device communicates with the management apparatus by a dedicated connection configured based on the second protocol.

6. The control system according to claim 1, wherein the relay device further comprises a storage that stores information indicating a location of the remote monitoring server.

7. A control system comprising:
a management apparatus configured to generate first-protocol transmission data based on operation data acquired from a facility device directly connected to the management apparatus; and
a relay device configured to communicate with a remote monitoring server via a network configured based on a first protocol, the relay device further configured to communicate with the management apparatus via a connection configured based on a second protocol different from the first protocol,
wherein the management apparatus comprises:
  a controller and memory;
  a selector configured to select whether the first-protocol transmission data is to be transmitted to the remote monitoring server or to the relay device;
  a first transmitter configured to transmit, when the remote monitoring server is selected by the selector, the first-protocol transmission data to the remote monitoring server; and
  a second transmitter configured to, when the relay device is selected by the selector, convert the first-protocol transmission data into second-protocol transmission data, and transmit the second-protocol transmission data to the relay device, and
wherein the relay device comprises:
  a controller and memory different from the controller and memory of the management apparatus; and
  a forwarder configured to receive the second-protocol transmission data from the management apparatus, convert the second-protocol transmission data into the first-protocol transmission data, and transmit the first-protocol transmission data to the network.

8. A management apparatus comprising:
a generator configured to generate first-protocol transmission data based on operation data acquired from a facility device directly connected to the management apparatus,
a setter configured to set whether or not to transmit first-protocol transmission data to a remote monitoring server configured to monitor the facility device via a network;
a first transmitter configured to transmit, when the first-protocol transmission data is set to be transmitted to the remote monitoring server, the first-protocol transmission data to the remote monitoring server; and
a second transmitter configured to, when the first-protocol transmission data is set not to be transmitted to the remote monitoring server, convert the first-protocol transmission data into second-protocol transmission data with a different protocol than the first-protocol transmission data, and transmit the second-protocol transmission data to a relay device connected to the remote monitoring server via a network configured based on a first protocol, wherein
the management apparatus further comprises a controller and memory.

9. The management apparatus according to claim 8, further comprising:
a receiver configured to receive secure data extracted by the relay device based on security criteria, the secure data being extracted from reception data received by the relay device via the network.

10. The management apparatus according to claim 8, wherein
the setter determines whether or not the first transmitter is connectable to the remote monitoring server, and when determining that the first transmitter is not connectable to the remote monitoring server, the setter sets not to transmit the first-protocol transmission data to the remote monitoring server.

11. The management apparatus according to claim 9, further comprising:
a data generator configured to generate the first-protocol transmission data when the secure data received contains a command signal directed to the management apparatus.

12. The management apparatus according to claim 8, wherein the second transmitter transmits the second-protocol transmission data to the relay device by a dedicated connection configured based on a second protocol.

13. The management apparatus according to claim 8, wherein
the relay device further comprises a controller and memory different from the controller and memory of the management apparatus.

* * * * *